United States Patent [19]

Park et al.

[11] Patent Number: 4,617,607
[45] Date of Patent: Oct. 14, 1986

[54] HIGH PRESSURE CAPACITIVE TRANSDUCER

[75] Inventors: Kyong Park, Chatsworth; Hung-Chih Chen, Cerritos, both of Calif.

[73] Assignee: Kavlico Corporation, Chatsworth, Calif.

[21] Appl. No.: 807,258

[22] Filed: Dec. 10, 1985

[51] Int. Cl.⁴ .............................................. G01L 9/12
[52] U.S. Cl. ....................................... 361/283; 73/724
[58] Field of Search ................... 73/718, 724; 361/283

[56] References Cited

U.S. PATENT DOCUMENTS 4,232,698 11/1980 Hosterman et al. ............. 361/283 X
4,414,851 11/1983 Maglie ............................... 73/724 X
4,425,799 1/1984 Park ....................................... 73/718

Primary Examiner—Donald A. Griffin
Attorney, Agent, or Firm—Poms, Smith, Lande & Rose

[57] ABSTRACT

A high pressure capacitive transducer includes a capacitive pressure transducer having an insulating diaphragm, and a high pressure fitting for housing the transducer. The high pressure fitting includes a flexible metal diaphragm bonded to the fitting, with the metal diaphragm in engagement with the insulating diaphragm. The metal diaphragm may be boned to the fitting around the periphery of the metal diaphragm to block the high pressure fluid from the transducer. The insulating diaphragm may be relatively thick, such as one-twentieth, one-tenth, or one-fifth of an inch thick, for example.

18 Claims, 3 Drawing Figures

HIGH PRESSURE CAPACITIVE TRANSDUCER

FIELD OF THE INVENTION

This invention relates to high pressure transducers, for measuring pressures of several thousand pounds per square inch or more.

BACKGROUND OF THE INVENTION

Transducers for measuring very high pressures, in the order of several thousand pounds or more, are known, but they tend to be relatively massive and expensive.

For measuring lower pressures, in the order of 1,000 psi or less, reference is made to the capacitive pressure transducer assemblies and circuitry shown in U.S. Pat. No. 4,388,668 granted June 14, 1983, U.S. Pat. No. 4,398,426 granted Aug. 16, 1983 and U.S. Pat. No. 4,227,419, granted Oct. 14, 1980, all of which are assigned to the assignee of the present invention. In the transducers shown in these patents, a thin diaphragm of low hysteresis insulating material, such as glass, or a ceramic such as alumina, is employed; and when pressure is applied to the diaphragm it flexes toward an adjacent base member, normally of the same material, and conductive layers on the facing surfaces change their spacing, thereby varying the capacitance between the two conductive layers. Standard circuitry included in the transducer converts the capacitance changes to an electrical signal varying linearly with the pressure changes. These pressure transducers are relatively inexpensive and have been widely used in automotive control and other applications.

Transducers for pressure ranges up to about 1000 psi have been made using substantially the arangements shown in the above cited patents. However, at pressures substantially above 1,000 psi, corresponding to more than 60 or 70 atmospheres or bars, standard low pressure transducer configurations are not entirely practical, as the pressure seals and other components cannot handle the very high pressures.

Accordingly, a principal object of the present invention is to provide an inexpensive high pressure transducer.

SUMMARY OF THE INVENTION

In accordance with the present invention, a basic capacitive transducer is provided having an insulating diaphragm of low mechanical hysteresis, mounted closely spaced to an insulating base member and with conductive layers on both the opposed surfaces. The source of high pressure fluid to be measured is coupled to high strength metal fitting containing a chamber having a thin, flexible, sheet metal diaphragm substantially co-extensive with and in contact with the insulating diaphragm, and welded or otherwise bonded to the fitting. Accordingly, as the high pressure varies, the pressure within the fitting is transmitted through the flexible metal diaphragm of the insulating diaphragm to operate the capacitive transducer.

The insulating base member and the insulating diaphragm are preferably of high compressive strength materials, and they are firmly secured into the high strength fitting, to preclude the possibility of a pressure blow-out. This function may be accomplished, for example, by the use of a heavy retaining ring threaded into the fitting and mechanically backing up the transducer and holding the insulating diaphragm firmly against the sheet metal diaphragm.

To indicate the order of magnitude of the dimensions which are involved, successful linear pressure measurement has been accomplished up to 9,600 psi, using a capacitive transducer approximately 1.2 inches in outer diameter, with an insulating alumina diaphragm about 0.2 inch thick, and a flexible stainless steel sheet approximately 0.004 inch thick and about 1.1 inches in diameter, in engagement with the outer surface of the diaphragm.

More generally, it is contemplated that the deflection of the insulating diaphragm is preferably from about one thousandth of an inch to several thousandths of an inch. Accordingly, depending on the desired pressure range the diameter of the transducer, and the materials of the insulating diaphragm and the sheet metal element, the thickness of the diaphragm and the sheet metal element may be varied. In general, for lower pressures the diaphragm thickness would be reduced. It also appears that a stainless steel sheet member could be used which would be somewhat thicker than the 0.004 inch thickness mentioned above, perhaps a thickness 0.010 inch.

The stainless steel disk may be recessed into a stainless steel fitting, and welded in place to prevent the application of high fluid pressure directly to the transducer or to its associated seals. The fitting should have a configuration to apply high pressure across a broad area of the sheet metal element, and this may be accomplished by the use of a chamber which may open out to encompass most of the area of the sheet metal element, from the high pressure fluid inlet coupling. An inportant advantage of the transducer as described hereinabove is that it is compatible with the methods of manufacture and the electronics as set forth in the above-cited patents which relate to lower pressure transducers. In addition, reliability is assured by confirming the high pressure zone of the unit behind the flexible metal diaphragm, thereby avoiding failure of seals or other portions of the transducer.

Other objects, features, and advantages will become apparent from a consideration of the following detailed description and from the accompanying drawings.

DETAILED DESCRIPTION

Figure 1:
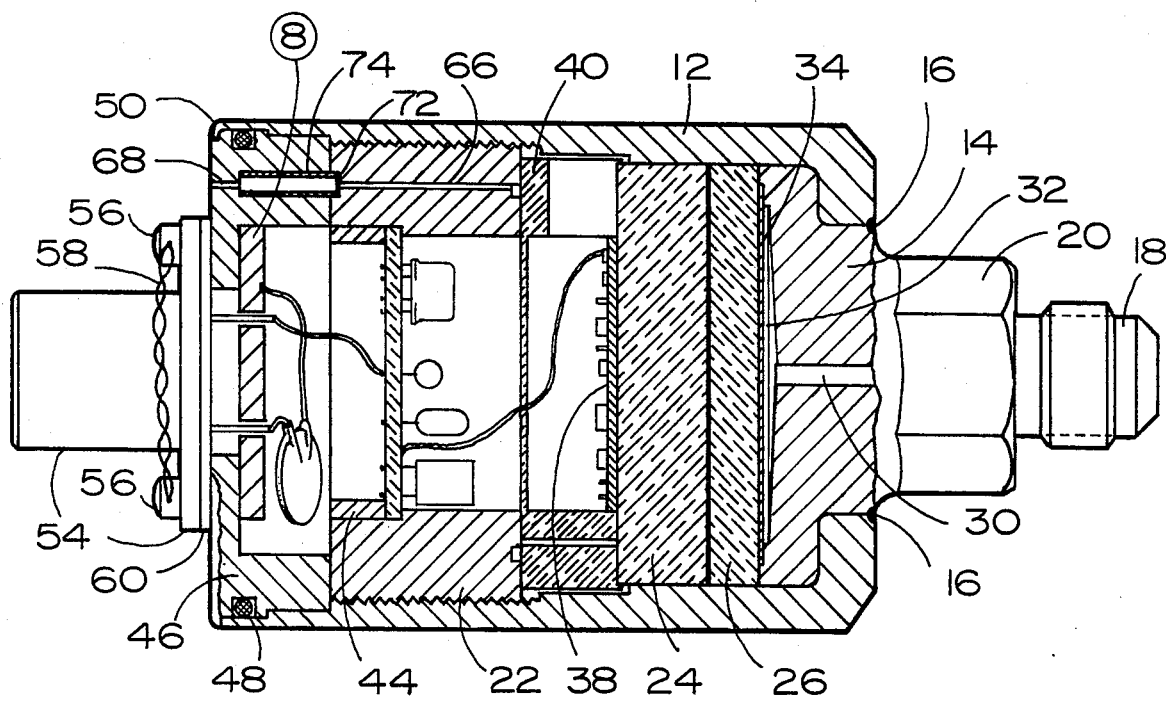
FIG. 1 is a cross-sectional view of a high pressure transducer illustrating the principles of the present invention.

Referring more particularly to the drawings, FIG. 1 shows a high pressure transducer having an outer housing 12 and a high pressure fitting 14 welded to the housing 12 around a weld 16 which has a circular configuration. At the right-hand end of the fitting 14 as shown in FIG. 1 is a conventional high pressure coupling 18. The fitting 14 is provided with a hexagonal configuration 20 for ease in securing against rotation, when the threaded high pressure retaining ring 22 is being threaded into position within the housing 12. Within the housing 12 is a pressure transducer including a base plate 24, and a relatively thick but bendable diaphragm 26. These two parts 24 and 26 may, for example, be made of alumina, or other insulating material having low mechanical hysteresis such as glass or ceramic. The diaphragm 26 is secured to and sealed to the base plate 24 by a peripheral ring of glass frit 28, which both spaces and seals the two members.

The high pressure coupling 18 connects to a channel 30 which in turn opens out into a chamber 32. A thin stainless steel plate 34 is recessed into the fitting 14 around its periphery facing the diaphragm 26, and the plate 34 is welded around this periphery to the fitting 14. The flexible sheet metal diaphragm 34 is in direct engagement with the ceramic diaphragm 26. It may also be noted that the metal diaphragm 34 completely seals the high pressure region including the channel 30 and the chamber 32, so that no high pressure fluid may penetrate within the assembly of FIG. 1, beyond the stainless steel diaphragm 34.

The diaphragm 26 is preferably spaced in the order of one to three thousandths of an inch away from the base plate 24, but lesser or greater separations such as from one-half of a thousandth of an inch up to about 20 thousandth of an inch, are contemplated. On the facing surfaces of the diaphragm 26 and the plate 24 are conductive electrodes, as disclosed in the prior patents cited above. When high pressure fluid is applied through the coupling 18 to the channel 30, it enters the chamber 32 and applies high pressure across the stainless steel diaphragm 34. With the stainless steel diaphragm 34 being in direct contact with the diaphragm 26, the diaphragm 26 is flexed inwardly to change the capacitance between the two metal electrodes.

Mounted on the left-hand side of the base plate 24, as shown in FIG. 1, is a small printed circuit board 38, on which is mounted the electrical circuitry for converting changes in capacitance resulting from changes in spacing of the electrodes into an output electrical signal such as a varying voltge or a varying frequency, which may be employed to indicate the input pressure to the transducer.

Figure 2:
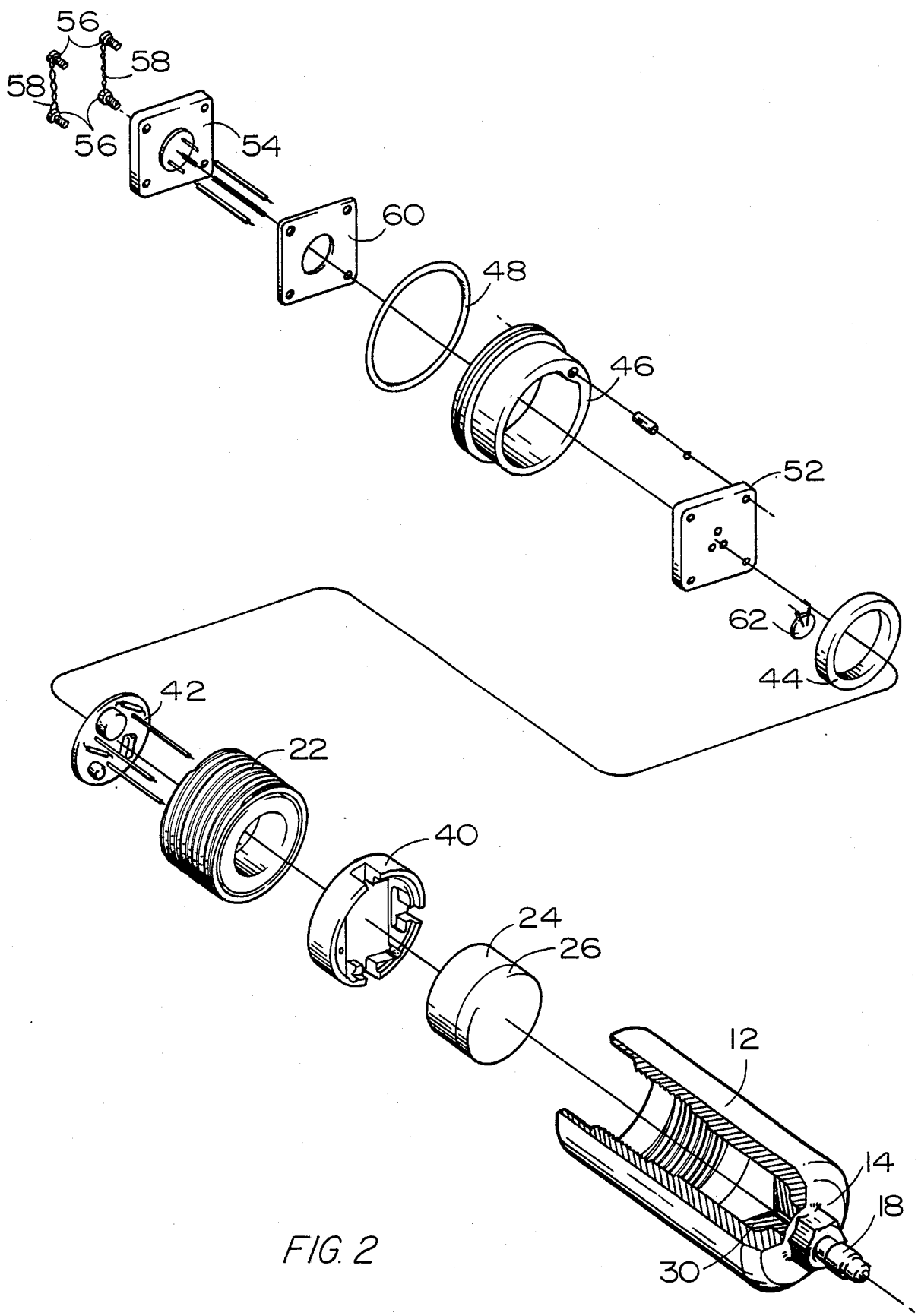
FIG. 2 is an exploded view of the transducer of FIG. 1.

Between the threaded retaining ring 22, and the transducer base plate 24, is a spacer 40 which may also be made of stainless steel. As shown to advantage in FIG. 2, the stainless steel spacer 40 may have a somewhat irregular configuration, in order to provide maximum engagement with the base plate 24 and still not interfere with the printed circuit board 38.

Another small printed circuit board 42 is mounted within the housing, and serves as the power supply for the printed circuit board 38. Holding the printed circuit board 42 in place within the threaded retainer ring 22, is an additional smaller retainer ring 44.

The rear housing member 46 is sealed against the left-hand end of the outer housing member 12, by the O-ring 48. The rear housing member 46 is held in place relative to the outer housing 12 by crimping the rear edges of the housing 12 over the rear housing 46, as shown for example at reference numeral 50.

Within the rear housing 46 is a metal plate 42, and the electrical connector assembly 54 is secured to the plate 52 by the four screws 56. Following complete assembly, the wires 58 are threaded through holes in the heads of the screws 56, to preclude any possible loosening of the screws. The gasket 60 seals between the connector assembly 54 and the rear housing 46. A filter capacitor 62 is mounted as shown in FIG. 1, adjacent the metal plate 52.

In order to permit the interior of the high pressure transducer of FIG. 1 to assume the ambient pressure, a filtered air passageway is provided. This includes the passageway 66 through the threaded retaining ring 22, and the passageway 68 through the rear housing 46. A small circular paper filter 72 is held in place in a recess in the threaded retaining ring 22 by the metal tube 74 which also extends into the rear housing 46 and couples to the channel 68.

Figure 3:
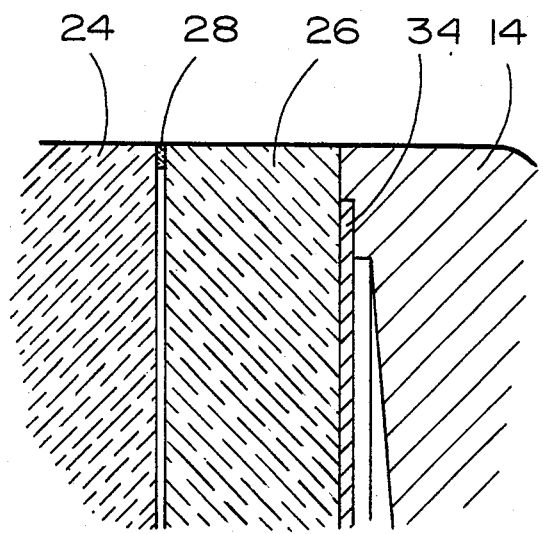
FIG. 3 is an enlarged cross-sectional view of a portion of FIG. 1.

FIG. 3 is included to provide an enlarged view of the passageway 30, the high pressure chamber 32, the stainless steel diaphram 34 and the ceramic or alumina diaphragm 26. In FIG. 3, the full engagement of the stainless steel diaphragm 34 with the alumina diaphragm 26 may be seen, and the smooth application of high pressure to the diaphragm may be appreciated. Also shown in FIG. 3 to an enlarged scale, is the glass frit 78 sealing between the diaphram 26 and the base plate 24, in addition to the two conductive electrodes, which are on the matching surfaces of the base plate 24 and the diaphragm 26. Incidentally, the configuration of these electrodes may take any of a number of configurations, including those shown in the issued patents to the assignee of the present invention, as cited hereinabove.

The method of manufacture of the transducer per se, including the steps for applying the electrodes and the glass frit, and for firing the transducers may also be as disclosed in the above-cited patents. The electrodes may be applied to the ceramic alumina disks by a silk screen process using a metallic paste, and a subsequent firing step bonds the thin metallic coatings forming the electrodes to the disks. The disks may be both bonded together, sealed, and spaced apart by the peripheral ring of glass frit. The glass frit may include particles of two different melting point glasses. The particle size of the higher melting point glass serves to determine the spacing of the electrodes, and firing of the glass frit is accomplished at a temperature above the melting point of the other lowering melting point glass, and below the melting point of the higher melting point glass. The spacing of the electrodes is preferably between about one-half and 20 thousandths of an inch, with a spacing of between 0.001 inch and 0.002 inch being preferred.

In conclusion, it is to be understood that the foregoing detailed description, and the accompanying drawings relate to one preferred illustrative embodiment of the invention. However, various changes may be made without departing from the spirit and scope of the invention. Thus, by way of example and not of limitation, the transducer per se, and the metal housing may be made of other materials than those mentioned hereinabove. In addition, the parts need not have the precise configuration described hereinabove, but may have alternative arrangements. Further, instead of the parts being made of metal, they may in many cases, be formed of high strength plastic. In addition, for suitable installations, the application of pressure to the diaphragm 34 need not be arranged with an initial small channel such as the channel 30 enlarging to the chamber 32. Instead, it could be a direct coupling from a high pressure vessel, to the diaphragm through a larger conduit. Accordingly, it is to be understood that the detailed description and the accompanying drawings as set forth hereinabove are not intended to limit the breadth of the present invention.

What is claimed is:

1. A simple and reliable high pressure transducer comprising:
 a capacitive pressure transducer made of two closely spaced insulating plates of low mechanical hysteresis material, said plates each having a layer of conductive material on their opposed faces forming electrodes which are spaced slightly apart from one-another, and at least one of said plates being a diaphragm which is flexible under high pressure to deflect toward the other plate and change the capacitance between said electrodes;

a high pressure fitting for mounting and enclosing said capacitive transducer, said high pressure fitting including a coupling for connecting to a source of high pressure fluid, and a high pressure chamber having an extent comparable to that of the insulating diaphragm;

a thin flexible metal diaphragm bonded to said fitting and sealing said high pressure chamber and blocking high pressure fluid from said transducer; and means for mounting said transducer within said fitting with the insulating diaphragm in firm engagement with said flexible sheet metal diaphragm, whereby, when the high pressure applied to said coupling changes, the deflection of said sheet metal member and insulating diaphragm change correspondingly, and the resultant changed output capacitance of the transducer indicates the new pressure level.

2. A high pressure transducer as defined in claim 1 wherein said insulating plates are made of alumina.

3. A high pressure transducer as defined in claim 1 wherein said fitting and said sheet metal diaphragm are made of stainless steel.

4. A high pressure transducer as defined in claim 1 wherein said insulating diaphragm is at least 0.1 inch thick.

5. A high pressure transducer as defined in claim 1 wherein said sheet metal diaphragm is in the order of three to twelve thousandths of an inch thick.

6. A high pressure transducer as defined in claim 1 wherein said sheet metal diaphragm is welded to and sealed to said fitting to block high pressure from said two insulating plates.

7. A high pressure transducer as defined in claim 1 wherein said two insulating plates and said sheet metal diaphragm are circular in configuration.

8. A high pressure transducer as defined in claim 1 wherein said insulating plates are formed of high compressive strength material.

9. A high pressure transducer as defined in claim 1 wherein said mounting means includes a heavy retaining ring in extended threaded engagement with said fitting for holding said two insulating plates with the insulating diaphragm firmly against said metal diaphragm.

10. A simple and reliable high pressure transducer comprising:

a capacitive pressure transducer made of two closely spaced insulating plates of low mechanical hysteresis material, said plates each having a layer of conductive material on their opposed faces forming electrodes which are spaced slightly apart from one another, and at least one of said plates being a diaphragm which is flexible under high pressure to deflect toward the other plate and change the capacitance between said electrodes;

a high pressure fitting for mounting and enclosing said capacitive transducer, said high pressure fitting including a coupling for handling pressures in excess of 5,000 psi for connecting to a source of high pressure fluid, and a high pressure chamber having an extent comparable to that of the insulating diaphragm;

a thin flexible metal diaphragm bonded to said fitting and sealing said high pressure chamber and blocking high pressure fluid from said transducer;

means for mounting said transducer within said fitting with the insulating diaphragm in firm engagement with said flexible sheet metal diaphragm; and said mounting means including a heavy retaining ring is extended threaded engagement with said fitting for holding said two insulating plates with the insulating diaphragm firmly against said metal diaphragm;

whereby, when the high pressure applied to said coupling changes, the deflection of said sheet metal member and insulating diaphragm change correspondingly, and the resultant changed output capacitance of the transducer indicates the new pressure level.

11. A high pressure transducer as defined in claim 10 wherein said insulating plates are made of alumina.

12. A high pressure transducer as defined in claim 10 wherein said fitting and said sheet metal diaphragm are made of stainless steel.

13. A high pressure transducer as defined in claim 10 wherein said insulating diaphragm is at least 0.1 inch thick.

14. A high pressure transducer as defined in claim 10 wherein said sheet metal diaphragm is in the order of three to twelve thousandths of an inch thick.

15. A high pressure transducer as defined in claim 10 wherein said sheet metal diaphragm is welded to and sealed to said fitting to block high pressure from said two insulating plates.

16. A high pressure transducer as defined in claim 10 wherein said two insulating plates and said sheet metal diaphragm are circular in configuration.

17. A high pressure transducer as defined in claim 10 wherein said insulating plates are formed of high compressive strength material.

18. A high pressure transducer as defined in claim 10 wherein said fitting has a shoulder for engaging said insulating diaphragm, and said shoulder is recessed to receive said metal diaphragm with the surface of said metal diaphragm flush with the surface of said shoulder to intimately engage said insulating diaphragm.

* * * * *